(12) United States Patent
Morier et al.

(10) Patent No.: US 10,749,368 B2
(45) Date of Patent: Aug. 18, 2020

(54) COMPUTER MOUSE CLOCK TUNING TO REDUCE ELECTROMAGNETIC INDUCED NOISE IN A WIRELESS CHARGING SYSTEM

(71) Applicant: Logitech Europe S.A., Lausanne (CH)

(72) Inventors: François Morier, Romanel-sur-Lausanne (CH); Laurent Plancherel, Lausanne (CH); Florian Jeannerat, Lausanne (CH); Jean Salathé, Lausanne (CH); Hugues Favey, Lausanne (CH); Frédéric Fortin, Annemasse (FR); Fabrice Sauterel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 57 days.

(21) Appl. No.: 15/705,020

(22) Filed: Sep. 14, 2017

(65) Prior Publication Data

US 2018/0351389 A1    Dec. 6, 2018

Related U.S. Application Data

(60) Provisional application No. 62/513,979, filed on Jun. 1, 2017.

(51) Int. Cl.
*H02J 7/02* (2016.01)
*G06F 3/0354* (2013.01)
*G06F 3/038* (2013.01)
*G06F 3/03* (2006.01)
*H02J 50/70* (2016.01)
(Continued)

(52) U.S. Cl.
CPC .............. *H02J 7/025* (2013.01); *G06F 1/266* (2013.01); *G06F 3/0304* (2013.01); *G06F 3/038* (2013.01); *G06F 3/0317* (2013.01); *G06F 3/0383* (2013.01); *G06F 3/0395* (2013.01); *G06F 3/03543* (2013.01); *H02J 7/342* (2020.01);
(Continued)

(58) Field of Classification Search
CPC ...... G06F 3/0304; G06F 3/033; G06F 3/0338; G06F 3/0346; G06F 3/0354; G06F 3/03541; G06F 3/03543; G06F 3/03544; G06F 3/038
USPC .................................................. 345/163–167
See application file for complete search history.

(56) References Cited

U.S. PATENT DOCUMENTS 6,329,860 B1 *  12/2001  Komatsu .............. H03K 3/0231
                                                               327/105
10,592,007 B2 *  3/2020  Morier .................. G06F 3/0383
(Continued)

*Primary Examiner* — Alexander Eisen
*Assistant Examiner* — Nelson Lam
(74) *Attorney, Agent, or Firm* — Kilpatrick Townsend & Stockton LLP

(57) ABSTRACT

A method of operating a computer mouse includes receiving electromagnetic (EM) radiation emitted from a source external to the computer mouse, the received EM radiation induces noise within one or more bands of noise frequencies and an image sensor circuit of the computer mouse generates erroneous movement detection signals in response to an operating frequency of the image sensor circuit being within the one or more bands of noise frequencies. The method further includes determining the operating frequency of the image sensor circuit, comparing the operating frequency to a target frequency, wherein the target frequency is outside of the one or more bands of noise frequencies, and tuning the operating frequency of the image sensor circuit towards the target frequency.

14 Claims, 8 Drawing Sheets

(51) Int. Cl.
  *G06F 1/26* (2006.01)
  *G06F 3/039* (2013.01)
  *H02J 50/10* (2016.01)
  *H02J 7/34* (2006.01)

(52) U.S. Cl.
  CPC .............. *H02J 50/10* (2016.02); *H02J 50/70* (2016.02); *G06F 2203/0384* (2013.01)

(56) References Cited

U.S. PATENT DOCUMENTS

| | | | | |
|---|---|---|---|---|
| 2004/0155860 A1* | 8/2004 | Wenstrand | ............ | G06F 1/3203 345/156 |
| 2006/0093018 A1* | 5/2006 | Chi | ............ | H04B 1/715 375/136 |
| 2007/0008042 A1* | 1/2007 | Lee | ............ | H03K 3/0231 331/16 |
| 2007/0287508 A1* | 12/2007 | Telefus | ............ | H02J 5/005 455/572 |
| 2008/0047764 A1* | 2/2008 | Lee | ............ | G08C 21/00 178/18.06 |
| 2010/0034238 A1* | 2/2010 | Bennett | ............ | H02J 5/005 375/130 |
| 2012/0299538 A1* | 11/2012 | Arai | ............ | B60L 53/65 320/108 |
| 2013/0055005 A1* | 2/2013 | Lee | ............ | H04B 1/3838 713/501 |
| 2013/0300351 A1* | 11/2013 | Gu | ............ | H02J 7/025 320/108 |
| 2014/0035378 A1* | 2/2014 | Kesler | ............ | H02J 17/00 307/104 |
| 2014/0139293 A1* | 5/2014 | Tsangaropoulos | ............ | H03L 1/022 331/48 |
| 2014/0191966 A1* | 7/2014 | Liang | ............ | G06F 3/0317 345/158 |
| 2014/0253705 A1* | 9/2014 | Kummailil | ............ | A61B 1/0638 348/68 |
| 2015/0326062 A1* | 11/2015 | Gonzalez Valdez | ............ | H04B 5/0037 320/108 |
| 2015/0365179 A1* | 12/2015 | Quiet | ............ | H04B 1/38 375/219 |
| 2016/0048745 A1* | 2/2016 | Jeong | ............ | G06K 15/00 358/1.15 |
| 2016/0085322 A1* | 3/2016 | Park | ............ | G06F 1/266 345/163 |
| 2017/0093197 A1* | 3/2017 | Gao | ............ | H02J 7/025 |
| 2017/0256978 A1* | 9/2017 | Sauterel | ............ | H02J 7/025 |
| 2017/0289425 A1* | 10/2017 | Takanashi | ............ | H04N 5/23203 |

\* cited by examiner

COMPUTER MOUSE CLOCK TUNING TO REDUCE ELECTROMAGNETIC INDUCED NOISE IN A WIRELESS CHARGING SYSTEM

CROSS-REFERENCES TO RELATED APPLICATIONS

This application is a non-provisional application of, and claims priority to, and the benefit of, U.S. Provisional Application No. 62/513,979, filed on Jun. 1, 2017, the disclosure of which is herein incorporated by references in its entirety for all purposes. This application is related to U.S. application Ser. No. 15/397,570, filed on Jan. 3, 2017, U.S. application Ser. No. 15/397,572, filed on Jan. 3, 2017, and U.S. Provisional Application No. 62/304,053, filed on Mar. 4, 2016, the disclosures of which are herein incorporated by reference in their entirety for all purposes.

BACKGROUND

Wireless peripheral devices (e.g., computer mice, keyboards, speakers, ear buds, smart wearables, etc.) are widely used and provide portability and convenience, but often suffer from poor battery life. Although battery technology continues to improve, most peripheral devices require a charging cable for extended usage, which can be cumbersome, limiting, and defeats the purpose of wireless technology in general. Some contemporary charging schemes solve this problem by utilize a charging base to wirelessly charge a peripheral device over time. Better methods of wireless charging are needed.

SUMMARY

In some embodiments, a computer mouse includes a housing, one or more processors coupled to the housing, and an image sensor circuit coupled to the housing and operatively coupled to the one or more processors. The image sensor circuit is configured to image a surface to detect movement of the computer mouse with respect to the surface. The image sensor circuit is configured to operate at an operating frequency while imaging the surface. The one or more processors are configured to tune the operating frequency of the image sensor circuit towards the target frequency in response to the operating frequency deviating from the target frequency. In some embodiments, the operating frequency can drift as a result of a change in temperature of the computer mouse.

In certain embodiments, the one or more processors are configured to tune the operating frequency of the image sensor circuit towards the target frequency in response to the operating frequency deviating from the target frequency by a threshold frequency value. In certain embodiments, the image sensor circuit configured to tune by at least a minimum frequency step. The one or more processors are configured to tune the operating frequency of the image sensor circuit towards the target frequency in response to the operating frequency deviating from the target frequency by at least the minimum frequency step. In certain embodiments, the one or more processors are configured to tune the operating frequency of the image sensor circuit towards the target frequency in response to the operating frequency deviating from the target frequency and a noise level increases to a threshold value. In some embodiments, the noise level is based on a surface quality measurement that is measured with a light emitting component of the computer mouse disabled from emitting light. In certain embodiments, the target frequency of the image sensor circuit is between 66 MHz and 68 MHz. In further embodiments, the target frequency can be within any of the following ranges: 66.9+/−50 kHz, 66.9+/−100 kHz, 66.9+/−200 kHz, 66.9+/−300 kHz, 66.9+/−400 kHz, 66.9+/−500 kHz, 66.9+/−600 kHz, 66.9+/−700 kHz, 66.9+/−800 kHz, 66.9+/−900 kHz, 66.9+/−1 MHz, and 66.9+/−1.5 MHz.

In certain embodiments, the target frequency is selected to produce a noise level in the image sensor circuit that is at a local minimum within a portion of a noise interference distribution that is induced by a wireless charging device that is electromagnetically coupled to the computer mouse to provide the computer mouse with electrical power.

In certain embodiments, the computer mouse further includes an external oscillator operatively coupled to the image sensor circuit, the external oscillator is configured to drive the image sensor circuit to operate at the operating frequency.

In some embodiments, an input device includes one or more processors, an energy storage component electrically coupled to the one or more processors, a charging circuit electrically coupled to the energy storage component, the charging circuit configured to wirelessly receive electromagnetic (EM) power from a base device to charge the energy storage component, the base device having a surface and the EM power having an EM frequency, and an image sensor circuit. The image sensor circuit is controlled by the one or more processors, and configured to image the surface of the base device to detect movement of the input device with respect to the surface of the base device. The image sensor circuit is configured to operate at an operating frequency and the EM frequency generates noise on the image sensor circuit to cause erroneous movement detection of the input device in response to the operating frequency of the image sensor circuit being within one or more bands of noise frequencies. The one or more processors are configured to tune the operating frequency of the image sensor circuit to prevent the operating frequency of the image sensor circuit from falling within the one or more bands of noise frequencies.

In some embodiments, a method of operating a computer mouse includes receiving EM radiation emitted from a source external to the computer mouse. The received EM radiation induces noise within one or more bands of noise frequencies and an image sensor circuit of the computer mouse generates erroneous movement detection signals in response to an operating frequency of the image sensor circuit being within the one or more bands of noise frequencies. The method further includes determining the operating frequency of the image sensor circuit, comparing the operating frequency to a target frequency that is outside of the one or more bands of noise frequencies, and tuning the operating frequency of the image sensor circuit towards the target frequency.

In certain embodiments the method further includes waking the computer mouse from a sleep mode before determining the operating frequency of the image sensor circuit. In certain embodiments, the method can further include suspending a position measurement of the computer mouse before determining the operating frequency and resuming the position measurement after tuning the operating frequency of the image sensor circuit. In certain embodiments, the EM radiation is received by an antenna of the computer mouse, the source external to the computer mouse is a base device and the antenna is electrically coupled to an energy storage component of the computer mouse configured to be charged with power provided by the EM radiation.

In some embodiments, a method of operating an input device includes suspending, for a suspension time period, a transmission of position data, determining an operating frequency of an image sensor circuit, comparing the operating frequency of the image sensor circuit to a target frequency, and tuning the operating frequency of the image sensor circuit to move toward the target frequency in response to the operating frequency deviating from the target frequency, and resuming the transmission of position data. The target frequency is selected based on an interference-induced noise within one or more frequency bands, and the interference-induced noise is caused by a wireless charging system operatively coupled to the input device. The interference-induced noise causes the image sensor circuit to generate erroneous movement tracking data in response to the operating frequency of the image sensor circuit falling within the one or more frequency bands and the target frequency is not included the one or more frequency bands.

In certain embodiments, the method further includes waking the input device from a sleeping state before determining the operating frequency of the image sensor circuit. In certain embodiments, resuming the transmission of position data further comprises sending position data that has accumulated during the suspension time period. In certain embodiments, the determining, the comparing and the tuning are accomplished within the suspension time period and, in certain embodiments, the suspension time period is less than a time period for accumulating a single report of position data.

In some embodiments, a method of operating an input device includes monitoring an interference level in an output of an image sensor circuit, the interference level induced by an electromagnetic (EM) field, determining one or more frequency bands where the interference level is below a threshold value, and determining that the operating frequency of the image sensor circuit is drifting away from the one or more frequency bands in response to a change in an operating temperature of the image sensor circuit. In response to determining that the operating frequency of the image sensor circuit is drifting away from the one or more frequency bands in response to a change in an operating temperature of the image sensor circuit, the method further includes dynamically adjusting an operating frequency of the image sensor circuit to remain in the one or more frequency bands.

DETAILED DESCRIPTION

Figure 1:
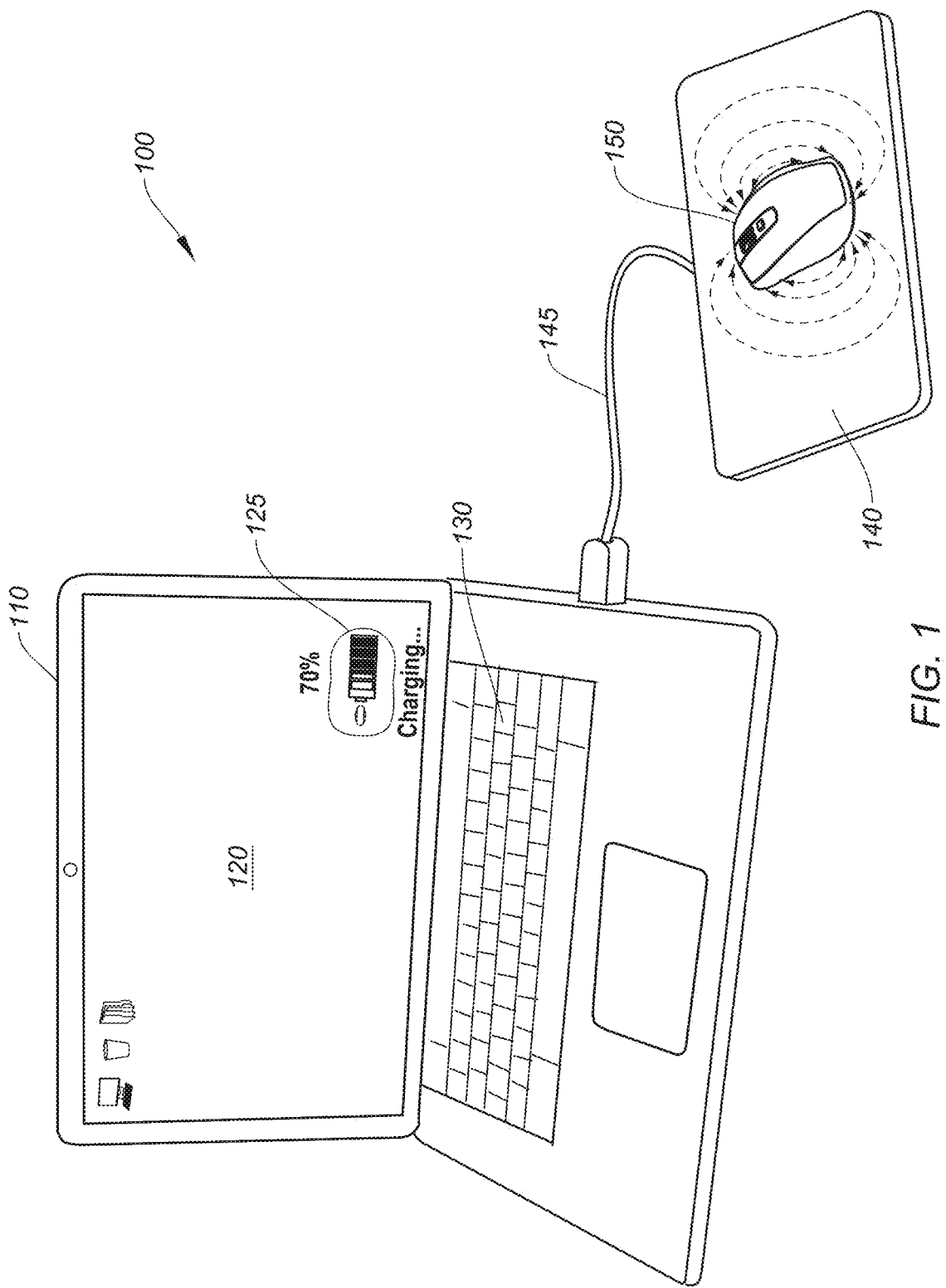
FIG. 1 shows a simplified diagram of a system for clock tuning for a wireless charging system, according to certain embodiments.

The present disclosure relates in general to input devices, and in particular to systems and methods for clock tuning for a wireless charging system.

In the following description, various embodiments of methods and systems for clock tuning for a wireless charging system will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain embodiments provide a method and system for tuning an internal clock (also referred to herein as an oscillator) of a wirelessly charged input device, such as a computer mouse. The input device is able to be charged from a charging mat (also referred to herein as a "base device") that also functions as a mouse pad. The base device can include a coil to generate an electromagnetic (EM) charging field that may be used to both charge an input device and provide enough power for its continuous operation without the need for an auxiliary power source.

In certain embodiments, the EM field emitted from the charging pad may couple into one or more sensors of the input device, e.g., in the image sensor circuit of an optical computer mouse, and thereby generate an interference signal (also referred to herein as "noise" or "EM field-induced noise") in the image sensor circuit. As described in more detail below, the EM field-induced noise in the image sensor circuit may depend on the either the frequency of the on-chip clock of the image sensor circuit and the frequency of the EM charging field, or both. In some cases, the EM-induced noise can cause the image sensor circuit to detect non-existent phantom features on an underlying surface, which may result in erroneous movement detection (i.e., the mouse cursor may jiggle, jump, or otherwise move in a manner that is inconsistent with the user's movement of the mouse).

According to certain embodiments, the input device may be a high-performance gaming mouse whose performance specifications are relatively strict. Generally speaking, a higher operating frequency of the image sensor circuit can provide for improved movement detection but also may result in higher power consumption and thus, lower battery life. Thus, there may exist an optimal operating frequency of the image sensor circuit that ensures both suitable battery life and also ensures that the device meets gaming specifications for movement detection and tracking (e.g., a resolution accuracy greater than 99%, a max acceleration of greater than 40 G and a speed of greater than 300 inches per second (ips)). For example, to achieve a suitable balance in the power consumption vs. performance trade-off, the frequency of the on-chip oscillator in the image sensor circuit may be actively maintained at a predetermined value, e.g., 68 MHz+/−3%.

The above requirement that the frequency be set to this particular predetermined value can be problematic because of the EM-induced noise described above. For example, due to certain manufacturing non-uniformities, referred to herein as "silicon spread," the nominal frequency of the on-chip oscillator may vary dramatically from chip to chip (e.g., by as much as 20% less than, or 40% greater than, the design frequency). Accordingly, if the design frequency is chosen to be 68 MHz, the actual clock frequency of any given chip can range from as low as 54.4 MHz to as high as 95.2 MHz. Consequently, for embodiments having a user input device that is a computer mouse, e.g., as shown in FIGS. 1-3, the "silicon spread" in the manufactured image sensor circuits may result in a correspondingly large spread in maximum acceleration, maximum speed, and rest mode timing (which may affect energy management and battery life). In some cases, the resulting products may not meet the required specification, and in each case, the noise spectrum of the EM-induced noise may vary, which can make noise filtering difficult.

In addition, the precise frequency of the on-chip clock can be sensitive to temperature. For instance, tests have shown that the on-chip oscillators can have a temperature-based drift of approximately −150 kHz/° C. Under normal operating conditions, a 20° C. to 30° C. change in operating temperature can be expected in a typical use case, which may be attributed to a variety of factors including, but not limited to, bringing the computer mouse from a cold environment to a hot environment, or vice versa, normal device heating during operational use, and the like. These factors may cause a temperature induced frequency shift that may be as high as 4.5 MHz under normal use conditions. Thus, even assuming chip-to-chip variation can be solved, the noise on the image sensor circuit will still drift over time with changing operating temperature because of the fact that the noise can depend on the on-chip clock frequency. As described in further detail below, certain embodiments provide for a clock tuning system and method that can greatly reduce erroneous movement detection caused by interference between the EM charging field and the on-chip clock of the image sensor circuit.

FIG. 1 shows a simplified diagram of a wirelessly charged system 100, according to certain embodiments. System 100 may include computing device 110 having display 120 and keyboard 130. Charging base device 140 can be coupled to computing device 110, and input device 150 is resting on base device 140. Computing device 110 can be a laptop computer, desktop computer, tablet computer, or other suitable computing device. Charging base device 140 can rest on a work surface (e.g., table, desk, etc.) and may be a computer mouse pad or other suitable device with a surface that input device 150 can rest on or move along. Input device 150 can be a computer mouse, remote control, presenter, or other suitable input device that can be configured to work in conjunction with base device 140. Although the embodiments described herein discuss input devices that move along the surface of base device 140, conventionally non-mobile devices can be charged by base device 140 as well, including but not limited to smart phones, smart wearables, ear buds, or any input device configured for wireless charging. Although the accompanying figures tend to show an input device resting on a base device, it should be understood that the various embodiments can charge the input device (via EM power coupling) while the input device is in use (in motion). In certain embodiments, system 100 may cause charging status icon 125 to be displayed on display 120 when input device 150 is being charged. Alternatively or additionally, one or more LEDs may light on input device 150 to indicate a charging level, charging state (e.g., charging or not charging), or the like.

Base device 140 can include one or more coils and a power supply (not shown) to generate an electromagnetic (EM) field. The EM field can be received by input device 150 via its own coil and supporting circuitry (as further described below) thereby facilitating the wireless transfer of power from base device 140 to input device 150. Input device 150 may store the received power in a local energy storage component (e.g., battery), power internal circuitry via the received power (e.g., processor(s), communication modules, etc.), or a combination thereof. In some embodiments, base device 140 may receive power from computing device 110 via cable 145 and/or base device 140 may receive power from an energy storage component, such as a power brick or battery. Alternatively or additionally, base device 140 may receive power from other sources, including wall sockets, external energy storage components (e.g., a battery block), or the like. Cable 145 can be of any suitable type (e.g., universal serial bus (USB), FireWire, etc.) and of any suitable length. In some cases, cable 145 may be integrated with other cables (e.g., multi-purpose, multi-standard cable). In further embodiments, base device 140 may include an energy storage system (e.g., multiple internal batteries) to provide wireless power. Base device 140 can function as a computer mouse pad (as shown) and may be of any suitable shape or size, and may utilize any number, size, or type of coils for EM emission. In some embodiments, base device 140 may be in a shape other than a pad. For example, base device 140 may be a block or similar object that can emit EM power, where input devices can receive EM power by being within a vicinity of the block (e.g., within 4-5 inches). One of ordinary skill in the art having the benefit of this disclosure would understand the many variations, modifications, and alternative embodiments thereof.

Figure 2A:
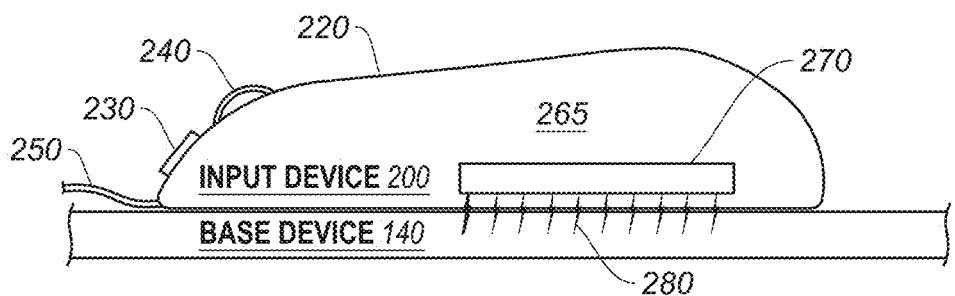
FIGS. 2A-2C show a system for clock tuning for a wireless charging system, according to certain embodiments.
Figure 3:
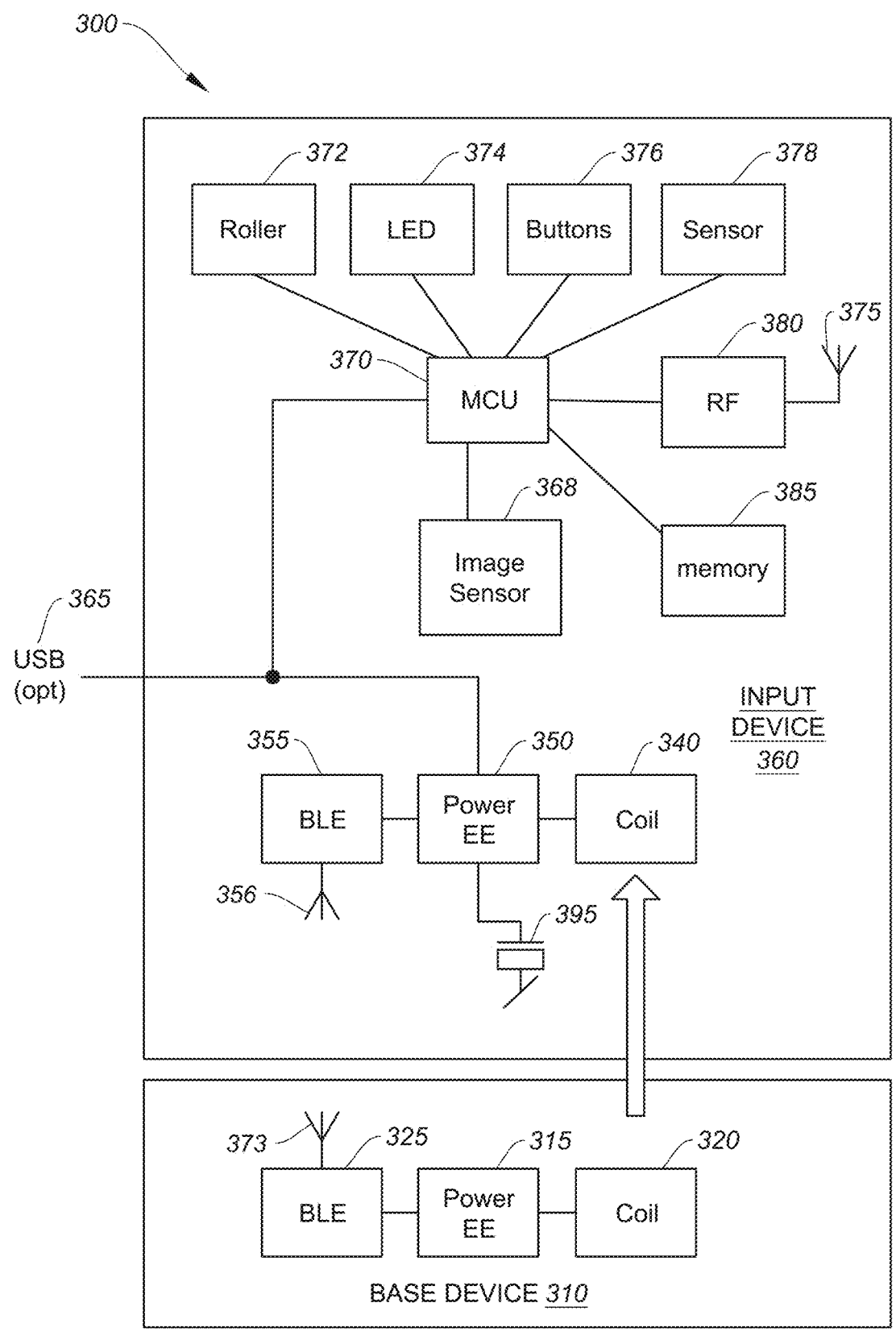
FIG. 3 shows a block diagram of a system for clock tuning for a wireless charging system, according to certain embodiments.

FIG. 2A shows a system for clock tuning for a wireless charging system, according to certain embodiments. More specifically, FIG. 2A shows an input device 200 having a housing 220 that encloses an internal volume of the input device. Housing 220 may house or support a number of internal electronics, e.g., one or more processors (not shown), button(s) 230, scroll wheel 240, optional power cable 250 (e.g., USB cable), and wireless power receiving module 270, which in some embodiments may be a removable modular insert. Button(s) 230, scroll wheel 240, or other functions of input device 200 (e.g., movement tracking, touch detection, etc.) can be controlled by one or more processors (not shown). Optional power cable 250 can be any suitable cable (e.g., USB, FireWire, etc.) to electrically and communicatively couple input device 200 to a computing device (e.g., laptop computer, desktop computer, etc.). Wireless power receiving module 270 may include an additional processor (not shown), or can be controlled by processor(s) that are external to the module. As described in further detail below in reference to FIG. 3, wireless power receiving module 270 can further include one or more coils to electromagnetically receive power from a base device 140 and a communication module to communicate with base device 140 to control the EM power coupling process between base device 140 and input device 200 (shown as electromagnetic coupling lines 280). Input device 200 can further include a battery (not shown) to store EM power received from base device 140.

In some embodiments, base device 140 can include a communication device (not shown) to enable communication between input device 200 and base device 140 (e.g., via a Bluetooth®-based communication protocol), which may include control signals that are passed from input device 200 to base device 140 and on to a corresponding host computing device (e.g., computing device 110).

Figure 2B:
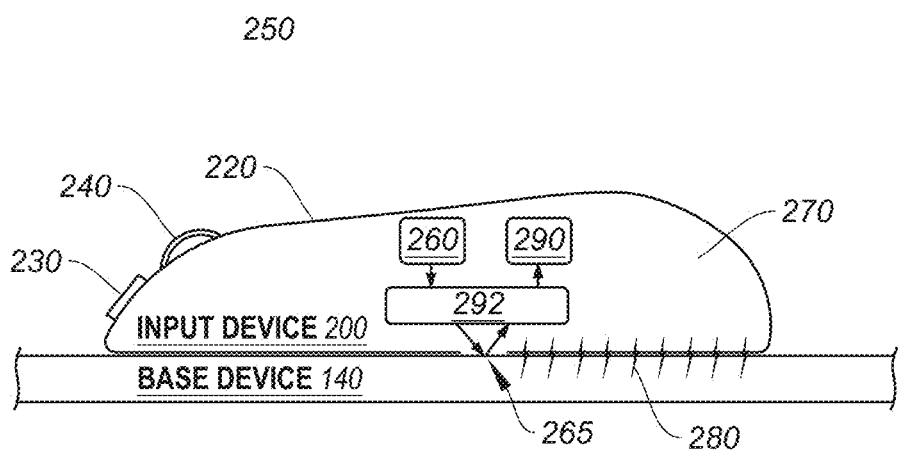

FIG. 2B again shows input device 200, this time focusing on a subset of electronics used to detect the position of the input device 200 on the surface of base device 140. According to certain embodiments, input device 200 further includes an illumination device 260 (e.g., a laser diode or LED) that is configured to illuminate the surface of base device 140. In one example, light 265 from illumination device 260 is directed through an optical system 292 and then onto the surface of base device 140. Reflected and/or scattered light then re-enters the optical system 292 and is redirected to image sensor circuit 290. Image sensor circuit 290 may then capture multiple images of the surface of the base device, where each image is a multi-pixel image of the illuminated surface of base device 140 at a given time. The embodiment shown in FIG. 2B shows one example employing an illumination device 260 and image sensor circuit 290 that are separate circuit elements, but one of ordinary skill will appreciate that these elements may be integrated without departing from the scope of the present disclosure.

Figure 2C:
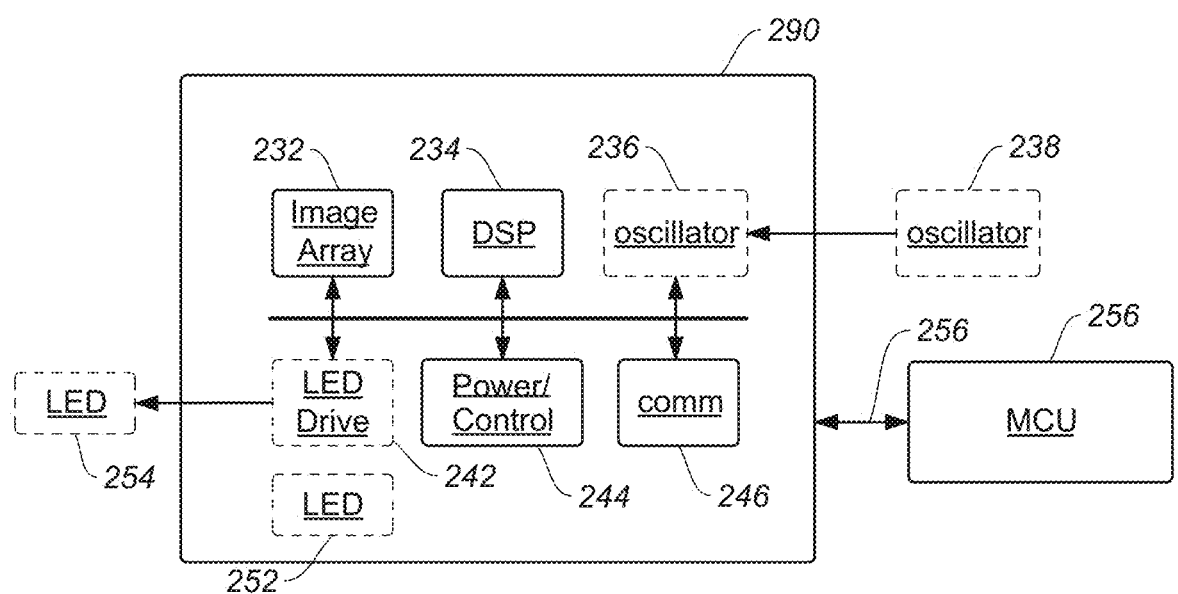

FIG. 2C shows a block diagram of an image sensor circuit 290, according to certain embodiments. Image sensor circuit 290 may include multi-pixel image array sensor 232, digital signal processor (DSP) 234, oscillator 236, LED drive circuit 242, LED 252, power supply and control circuit 244, and communication circuit 246. According to certain embodiments, these elements may be integrated into the same package, or even into the same piece of silicon. In other embodiments, the oscillator and/or LED may be external to the chip (e.g., oscillator 238 and LED 254). The multi-pixel image array sensor 232, which may be, e.g., a multi-pixel CMOS sensor, photodiode array, or the like, can capture images of the surface of the base device as illuminated by LED 252/LED 254 and provide raw image data to DSP 234 for processing. DSP 234 may then process the raw image data into suitable motion data, e.g., $\Delta x$ and $\Delta y$ displacement values. The motion data may then be transferred to an external processor(s) 256 (e.g., an external microcontroller/microprocessor MCU) via communication circuit 246, which may be, e.g., an interface for SPI, I2C, USB communication, or the like. Furthermore, in certain embodiments, image sensor circuit 290 may also include an oscillator 236, which itself may be on-chip, that drives the image sensor circuit at an operating frequency, e.g., by setting the pixel readout rate for the multi-pixel image array sensor 232, also referred to herein as the operational frequency of the image sensor circuit 290. To provide more precise control over the operational frequency, the image sensor circuit 290 may have one or more externally accessible I/O interfaces, or pins, for reading and/or externally programming the frequency of the oscillator 236, e.g., by way of an external clock tuning signal provided by processor (s) 256. Accordingly, the operating frequency of oscillator 236 may be stabilized to provide for improved motion detection and tracking, as described in further detail below. Alternatively, image sensor circuit 290 may be externally clocked using an external oscillator 238 (e.g., a stabilized crystal oscillator, or the like.)

FIG. 3 shows a block diagram of a system for clock tuning for a wireless charging system, according to certain embodiments. System 300 may include an input device 360, e.g., a wireless computer mouse that supports USB communication and/or RF communication, and base device 310, e.g., a wireless charging mousepad for charging input device 360.

In some embodiments, the input device 360 includes a wireless charging circuit for receiving electromagnetic power from the base device 310 to charge the energy storage component 395. The wireless charging circuit can include coil 320, coupling control block 350, communication block 355 that may be operatively coupled to processor(s) 370. Coils 320 and 340 can be used to wirelessly (i.e., electromagnetically) transmit and receive power, respectively. Coils 320 and 340 may be discrete components (e.g., through-hole or surface mount devices) or integrated devices. Coils 320 and 340 may be any suitable size, shape, or location as required by design without departing from the scope of the present disclosure. In some embodiments, energy storage component 395 can be charged wirelessly through the electromagnetic power coupling between coils 340 and 320 or, optionally, via a tethered optional USB port 365. However, optional USB port 365 may not be necessary because, according to certain embodiments, base device 310 can provide enough continuous power to input device 360 such that the energy storage component 395 can remain charged and thus input device 360 can remain powered while on the surface of base device 310.

The base device 310 may further include coupling control block 315 and communication block 325. Likewise the input device may further include coupling control block 350 and communication block 355. Coupling control block 315 and communication block 325 may further include one or more processors that can control electromagnetic power generation and receipt to/from the respective coils. According to certain embodiments, the power control may be based on signals received from communication block 325 and/or communication block 355. In addition, communication blocks 325 and 355 may control communication between base device 310 and input device 360. Communication blocks 325 and 355 can also be configured to provide wireless communication between input device 360 and a host computer (e.g., computing device 110 of FIG. 1), to provide communication within the input device 360, or a combination thereof. Communications blocks 355, 325 can be configured to provide radio-frequency (RF), Bluetooth®, Bluetooth LE®, infra-red, Z-Wave®, ZigBee®, or other suitable communication technology to enable the wireless communication. Some embodiments may utilize different types of cables or connection protocol standards to establish hardwired communication with other entities within or amongst their respective blocks.

Communication control block 380 and antenna 375 can employ any suitable communication protocol including, but not limited to, radio-frequency (RF), Bluetooth®, Bluetooth LE®, infra-red, Z-Wave®, ZigBee®, or other suitable communication technology to enable wireless communication between input device 360 and an associated host computing device (e.g., laptop computer, desktop computer, tablet computer, etc.). Optional USB port 365 can control communication between input device 360 and an associated host computing device.

Coupling control block 350 may control power management and communication between base device 310 and input device 360 (e.g., via antennas 356 and 373) to control the electromagnetic power coupling process (e.g., coupling control block may be responsible for communication with base device 310 to indicate that input device 360 is in use and ready to receive electromagnetic power from base device 310. Likewise, coupling control block 315 may be responsible for communication with base device 310 to indicate that input device 360 is idle and may trigger a "sleep mode" on input device 360. Likewise, coupling control block 315 can control electromagnetic power generation, the operation of the coil 320, and the operation of communication block 325.

According to some embodiments, coupling control block 315 can control EM power emission based on a number of factors. In some cases, coupling control block 315 may cause base device to always emit EM power. Coupling control block 315 may control EM power emission based on whether an input device is on (e.g., resting on or sliding on) base device 310. Such embodiments may include one or more pressure sensors, image sensors, or the like (not shown) that can detect when input device 360 is contacting a surface of base device 310. In some cases, coupling control block 315 may cease EM emission when communication with input device 360 is lost. Alternatively or additionally, coupling control block 315 may continue EM emission for a period of time (e.g., 2 seconds) to accommodate for "skating" (when a user operates a mouse by frequently lifting and repositioning) or similar use cases. In certain embodiments, coupling control block 315 may modulate an amount of EM emission based on an energy state of energy storage component 395 on input device 360, e.g., in a case where energy storage component 395 is a rechargeable battery. For instance, when the energy state is low, EM emission may be set to a maximum value. When the energy state is relatively high, EM emission may be reduced or shut down for improved power efficiency. One of ordinary skill in the art would understand the many variations, modifications, and alternative embodiments thereof. Energy storage component 395 can be any suitable replaceable and/or rechargeable energy storage component including a lithium polymer battery, NiMH, NiCd, super capacitor or the like.

Input device 360 can further include processor(s) 370, roller control block 372, LED control block 374, button control block 376, sensor control block 378, and image sensor circuit 368. Processor(s) 370 may be a microcontroller unit (MCU) and may control the operational features of the computer mouse including roller control block 372 (e.g., scroll wheel), LED control block 374, button control block 376, and sensor (e.g., touch sensors) control block 378, image sensor circuit 368, or the like.

One of ordinary skill will also appreciate that both the input device 360 and base device 310 of the system 300 may include a bus system to transfer power and/or data to and from the different systems therein. In some embodiments, input device 360 may include a memory subsystem 385. Memory subsystem 385 can store one or more software programs to be executed by processors (e.g., processor(s) 370). It should be understood that "software" can refer to sequences of instructions that, when executed by processing unit(s) (e.g., processors, processing devices, etc.), cause other elements of input device 360, e.g., processor(s) 370 and/or image sensor circuit 368, to perform certain operations of software programs. The instructions can be stored as code, e.g., firmware residing in any form of non-transitory computer-readable medium residing on memory subsystem 385 and/or integrated within embodiments of processor(s) 370.

Coupling control blocks 315 and 350 and also processor(s) 370 may include any suitable type of processor. For example, they can include one or more microprocessors (Cs) and can be configured to control the power generation and transmission from the coil 340. In some embodiments, the processor(s) can also control the operation of input device 360. In other embodiments, the processor(s) may include one or more microcontrollers (MCUs), digital signal processors (DSPs), or the like, with supporting hardware and/or firmware (e.g., memory, programmable I/Os, etc.), as would be appreciated by one of ordinary skill in the art having the benefit of this disclosure. Alternatively, MCUs, Cs, DSPs, or the like, may be configured in other system blocks of system 300. For example, communication blocks 325, 355 may include a local processor to control the various communications described herein. In some embodiments, multiple processors may provide an increased performance in speed and bandwidth. It should be noted that although multiple processors may improve performance in system 300, they are not required for standard operation of the embodiments described herein. In some embodiments, the processor(s) found in each system block may work in conjunction with a processor on its corresponding device (e.g., input device 360 or base device 310) or may wholly control the operation of input device 360 or base device 310.

According to certain embodiments, processor(s) 370 may receive mouse tracking data (e.g., displacement data) from the image sensor circuit 368, further process this data and then transmit the processed data to an associated host computing device by way of wireless communication through communication control block 380. In addition, processor(s) 370 may provide a clock tuning signal to image sensor circuit 368 to set and/or adjust (also referred to herein as tune) an operating frequency of one or more on-chip oscillators of image sensor circuit 368, as described above in reference to FIG. 2C. According to certain embodiments, the processor(s) 370 can receive a signal that directly encodes for the clock frequency, e.g., in the form of digital or analog signals from image sensor circuit 368. Other embodiments may receive an output waveform or other signal from image sensor circuit 368 and the processor(s) 370 can then use this signal to compute the operating frequency of the on-chip oscillator, e.g., the signal may be a waveform and the frequency can be determined from the waveform using a counter or counting functionality that may be available to processor(s) 370.

According to certain embodiments, if processor(s) 370 determines that the operating frequency of image sensor circuit 368 has deviated too far from a target frequency (where the previously determined target frequency is chosen to providing low movement/tracking error, as described in further detail below) processor(s) 370 can tune the clock tuning signal being provided to the image sensor circuit 368 to bring its operating frequency closer to the target frequency.

Although the specific embodiments described in the Figures herein have separate circuits to handle EM power emission and wireless communication, some embodiments may combine them. For instance, EM power emission can be encoded via amplitude, frequency, and/or pulse-width modulation to communicate from base device to input device and/or modular insert. One of ordinary skill in the art with the benefit of this disclosure would understand the many variations, modifications, and alternative embodiments thereof.

Figure 4E:
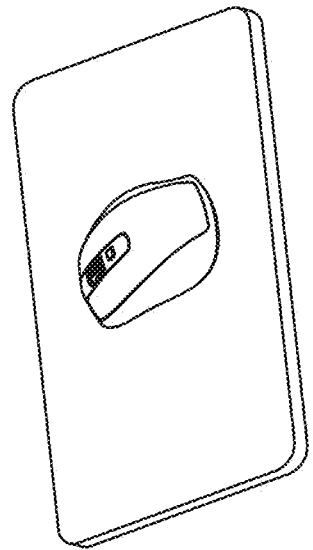
FIGS. 4A-4F show simplified diagrams of a system utilizing a wireless charging system for charging an input device and examples of sensor images, according to certain embodiments.
Figure 4F:
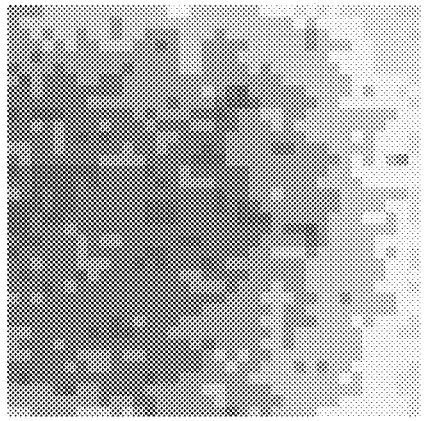
Figure 4C:
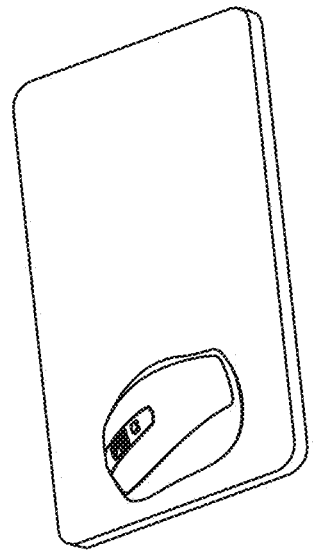

For certain frequencies of the on-chip clock, the EM power emission from the mouse pad (which can be a fixed frequency of 6.78 MHz) can cause undesirable noise or interference inside the input device's sensor electronics when the input device is located on certain positions of the charging pad, e.g., when the computer mouse ("mouse") is located in particular in areas where the electromagnetic field emanating from the pad is strongest. According to certain embodiments, the precise location of maximum interference depends on the antenna design and shape, as well as the placement of the connection legs to the amplifier circuit in the base device. Accordingly, in any given physical implementation, there will be several positions where the EM field is strongest and thus the undesirable noise or interference is also strongest. FIGS. 4A, 4C, and 4E show a computer mouse on certain positions of the charging pad and FIGS. 4B, 4D, and 4F show corresponding multi-pixel image data, e.g., as might be produced by multi-pixel image array sensor 232 of image sensor circuit 290 of FIG. 2.

Figure 4D:
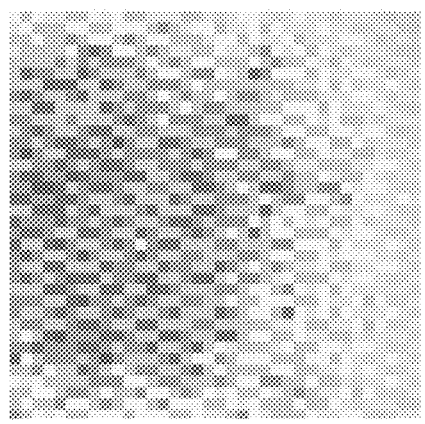
Figure 4A:
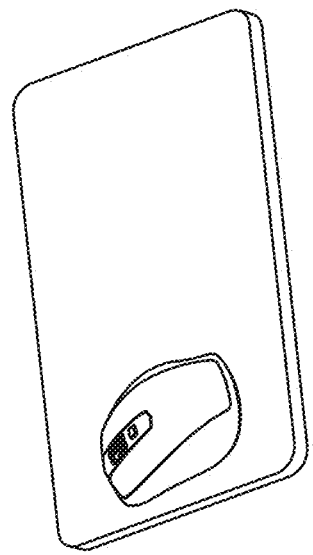
Figure 4B:
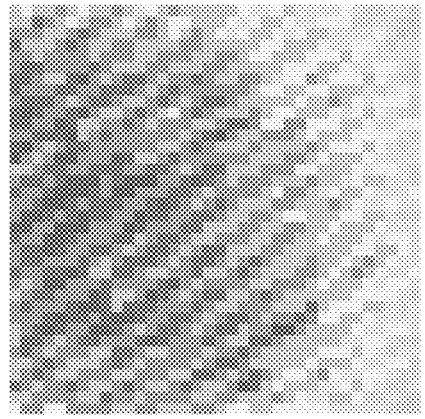

For example, FIG. 4A shows a mouse located at a position where the EM field is relatively weak, and thus, the noise on the image sensor circuit may be minimal, as shown in the multi-pixel image data of FIG. 4B. In this example, the image features of the interference-free signal are generally consistent with the underlying surface of the pad being imaged. It should be noted that the surface being imaged in FIGS. 4B, 4D, and 4F is fairly uniform, and the image in FIG. 4B shows a fairly uniform profile, as expected. The dominant stable image features in FIG. 4B reflect the real surface features of the surface. Random noise may also be present in the image and here, such random noise is visible as slightly brighter or slightly darker pixels that are uniformly and randomly distributed through the image and of a relatively low intensity compared to the real surface features. Therefore, this random noise does not significantly affect the image signal and stable and accurate movement detection results as the mouse is held stable and/or slid across the surface.

However, when the mouse is located on a position of the mouse pad having a relatively strong EM field, as shown in FIG. 4C, the noise on the image sensor circuit may be dominated by EM interference from the base device's EM charging field and this interference-induced noise may be qualitatively different from the typical random noise of FIG. 4B. As shown in the image of FIG. 4D, in some embodiments, the interference-induced noise may take the form of explicit patterns (e.g., a checkerboard pattern) appearing in the multi-pixel image data. Specifically, FIG. 4D shows that each row of pixels may have a noise signal that results in alternating bright and dark bands in the image. Furthermore, the phase of this alternating bright-dark pattern may alternate between a one (or more) pixel advance and a slight one (or more) pixel retreat as one moves down the image, row-by-row. Consequently, according to certain embodiments. the interference-induced noise may manifest as a checkerboard pattern even if the underlying surface has no such checkerboard features. In this example, filtering of the signal may still result in normal tracking performance with reduced spurious movement. However, according to certain embodiments, this type of pattern may not be stable, e.g., this pattern may change over time as the operating temperature of the mouse and/or image sensor circuit drifts and/or as the image sensor circuit's operating frequency changes.

FIG. 4E shows the mouse in a position that is similar to that shown in FIG. 4C, but in this example, the operating temperature and/or operating frequency of the image sensor circuit may have drifted as compared to the situation shown in FIGS. 4C-4D. As before, the interference-induced noise may take the form of explicit patterns, but in this case, the patterns manifest as repeatable diagonal bars or fringes appearing in the multi-pixel image data. Specifically, FIG. 4F shows that each row of pixels may have a noise signal that results in alternating bright and dark bands in the image with the phase of this alternating bright-dark pattern slightly advancing (or alternatively retreating) for each row as one moves row-by-row down the image. Accordingly, this example of interference-induced noise can manifest as a robust pattern of diagonal lines that extends across the image, even if the underlying surface has no such diagonal features. In addition, these interference-induced noise features may not even be stable in time, e.g., as the operating temperature changes the spatial frequency may change, the patterns may advance or recede and/or the pattern shown in FIG. 4F may transition over time to the pattern shown in FIG. 4D. Furthermore, for the case of the diagonal line noise pattern shown in FIG. 4F, it may be difficult to effectively remove the noise through filtering or post-processing of the raw image signal without also filtering out a substantial portion of the legitimate movement signal, e.g., a pattern of diagonal lines may be filtered out using standard image processing techniques, but this process may severely degrade the mouse's ability to detect diagonal movement. Without an effective filtering technique, the diagonal noise features on the image sensor's on-chip oscillator may be interpreted as features (referred to as "phantom features") and thus may result in erroneous movement detection signals and thus, spurious motion of the mouse cursor even though the mouse itself may not be moving.

Extensive testing of a number of different image sensor circuits and user input devices revealed that the nature of the noise on the image data is related to a modulation or interference between the EM power emission (set at a fixed frequency) and the pixel-by-pixel read frequency of the analog-to-digital conversion electronics of the multi-pixel array image sensor of the image sensor circuit. According to some embodiments, the EM power emission frequency f_EM can be set to be 6.78 MHz+/−15 kHz (e.g., as required by a wireless charging standard) while the pixel-by-pixel read frequency is set by the frequency of the on-chip oscillator f_clock (e.g., may be half the frequency of the on-chip oscillator), which is typically about 68 MHz.

Figure 5:
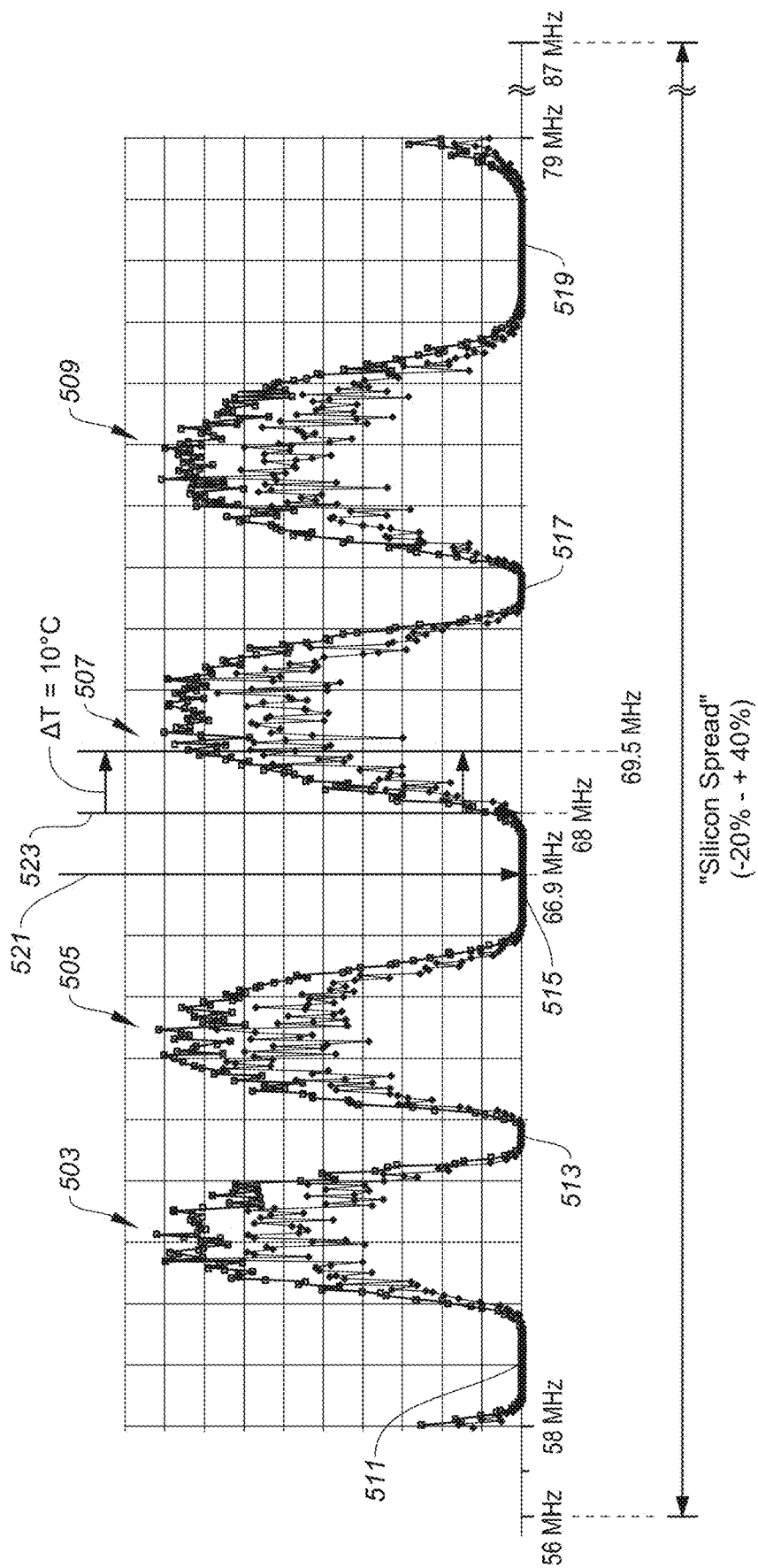
FIG. 5 shows DarkSQUAL sample data, according to certain embodiments.

FIG. 5 shows a noise interference distribution, more specifically a surface quality ("SQUAL") frequency distribution according to certain embodiments. Generally, SQUAL is a quantitative measure of the quantity and quality of surface features on a surface (e.g., a mouse pad) and may be computed by the image sensor circuit according to certain embodiments. More specifically, the image sensor circuit produces a SQUAL value that is readable from one or more registers of the image sensor circuit. FIG. 5 shows a specific type of SQUAL measurement, referred to herein as "DarkSQUAL," where during the SQUAL measurement, the illuminating device of the input device (e.g., a mouse's LED or laser) is disabled from emitting light, i.e., turned off, and thus, the surface being characterized is "in the dark." Because the surface is not even visible for this measurement, DarkSQUAL is not a measure of real surface features, but rather is a measure of apparent (or phantom) surface features. Thus, in an ideal system with no spurious noise, DarkSQUAL should be zero because the surface simply is not visible to the sensor. However, if there is spurious or EM-induced noise in the image signal, the sensor may still report phantom surface features even though the surface is not illuminated, as described above in reference to FIGS. 4A-4F. Furthermore, if these phantom surface features move or change, mouse tracking can be negatively affected and erroneous movement detection can result. Accordingly, in a wireless charging circuit such as that described here, the DarkSQUAL noise level can provide a quantitative measure of the interference level, i.e., the DarkSQUAL provides a quantitative measure of the noise induced on the image sensor circuit by the EM field of the charging pad.

The particular measurement of DarkSQUAL shown in FIG. 5 was taken by tuning f_clock over a range of frequencies while holding f_EM constant at 6.78 MHz+/−15 kHz.

As is seen in FIG. 5, as f_clock is varied, the average DarkSQUAL of the mouse rises and falls creating many local maxima and minima in the DarkSQUAL signal. More specifically, FIG. 5 shows that the system exhibits Dark-SQUAL maxima 503, 505, 507, and 509 at approximately 61.2 MHz, 64.4 MHz, 69.6 MHz, and 73.7 MHZ, respectively. Likewise the system exhibits DarkSQUAL minima 511, 513, 515, 517, and 519 at approximately 59.0 MHz, 62.75 MHZ, 66.9 MHz, 71.75 MHz, 77.25 MHz, respectively. Accordingly, a series of bands of noise frequencies exist that, in order to be stable, the operating frequency of the image sensor circuit should avoid, i.e., the one or more processors of the input device will operate to prevent the image sensor circuit from operating at an operating frequency that is within any of the bands of noise, e.g., through any of the methods described below in reference to FIGS. 6-7. For example, the operating frequency of the image sensor circuit should avoid, i.e., not operate, within the following bands of frequencies: 59.6 MHz-62.4 MHz, 63 MHz-66 MHz, 68 MHz-72 MHz, 73 MHz-75 MHz. These ranges are not meant to be limiting but instead should serve as merely one example of frequencies that should be avoided so that the input device can minimize erroneous movement detection. One of ordinary skill having the benefit of this disclosure will appreciate that the width of the bands may be wider or narrower depending on the operating characteristics of the system, e.g., based on the nature and effectiveness of any noise filtering. Likewise, one of ordinary skill will appreciate that under different wireless charging standards, the frequency for transmission of EM power may differ from 6.78 MHz and thus the location of the relevant maxima and minima (and the frequency bands that should be avoided) may be different form that shown in FIG. 5. Likewise, the position of the maxima and minima may be different for different image sensor circuits because different sensors may have different numbers of pixels and thus a different readout rate. Nevertheless, one of ordinary skill having the benefit of this disclosure will appreciate that using the methods disclosed herein, the location of maxima and minima in the DarkSQUAL interference-induced noise distribution can be determined for any system operating at any EM frequency without departing from the scope of the present disclosure.

It should be pointed out that at the maxima, average DarkSQUAL can be as high as 30 with a standard deviation of 40, representing a sizeable fraction of a fully illuminated SQUAL signal (which can be in a range of 95-115 for a typical gaming mouse pad). As described above, for performance and power management reasons, the clock frequency of the image sensor in a typical gaming mouse may be around 68 MHz (indicated as element 523 of FIG. 5). However, considering the magnitude and frequency characteristics of the EM induced DarkSQUAL error coupled with the susceptibility of the image sensor circuit to temperature-induced frequency shifts, the operational frequency of the image sensor circuit (e.g., 68 MHz) can be precariously close to the upslope of certain DarkSQUAL maxima. For instance, as shown in FIG. 5, the average DarkSQUAL at 68 MHz can be less than 5. However a temperature-induced frequency shift of −150 kHz/° C. can be expected from the on-chip oscillator, such that even a modest operating temperature drop of −10° C. can lead to a clock frequency increase of 1.5 MHz. Such a shift puts the on-chip clock's frequency at 69.5 MHz (shown as element 507), which is nearly at the peak of the DarkSQUAL noise signal. Once near the peak of the DarkSQUAL signal, the input device may experience a spurious tracking signal accompanied by erroneous movement detection (i.e., the mouse cursor may jiggle, jump, or otherwise move as the tracking algorithm attempts to track phantom surface features that are caused by the injected noise from the charging pad).

Returning to FIG. 5, according to certain embodiments, a target frequency 521 for the on-chip clock can be approximately 66.9 MHz, e.g., within an endpoint inclusive or exclusive band of 66.9+/−50 kHz, 66.9+/−100 kHz, 66.9+/−200 kHz, 66.9+/−300 kHz, 66.9+/−400 kHz, 66.9+/−500 kHz, 66.9+/−600 kHz, 66.9+/−700 kHz, 66.9+/−800 kHz, 66.9+/−900 kHz, 66.9+/−1 MHz, or 66.9+/−1.5 MHz. In other embodiments an target frequency can be any frequency (or frequency range) that keeps the DarkSQUAL less than 10 but other noise thresholds are possible without departing from the scope of the present disclosure. One of ordinary skill having the benefit of this disclosure will appreciate that due to manufacturer-to-manufacturer variation in the particulars of how SQUAL is defined and/or computed, the precise numerical value of SQUAL may not be a critical design parameter, rather it may be that most designs will operate at or below a certain SQUAL threshold in order to minimize erroneous movement detection, i.e., to keep operating characteristics of the mouse within the specifications for the input device.

Returning again to the example shown in FIG. 5, target frequency 521 may be desirable for a few reasons. First, at 66.9 MHz, the operating frequency of the image sensor circuit is placed in the center of minimum 515 of the DarkSQUAL signal rather than on the edge of an upslope, as is the case for a typical operating frequency set at 68 MHz (element 523 of FIG. 5). Secondly, the minimum 515 is preferable to the other minima on the DarkSQUAL curve because it is relatively wide (approximately 3 MHz wide) in comparison and also is as close to the original 68 MHz operating frequency of the image sensor circuit, which, as described above, is chosen to ensure the required performance and power management characteristics of the mouse. In some embodiments, shifting the operational frequency from 68 MHz to 66.9 MHz to place it in the center of minimum 515 does not substantially or materially degrade the performance and battery life characteristics of the input device.

As described in further detail below in reference to FIGS. 6-7, in order to avoid the above issues related to operating at a sub-optimal on-chip clock frequency, certain embodiments provide for firmware in the input device that, when executed, can cause the input device to perform a clock tuning operation to periodically or continuously adjust the on-chip clock frequency to be at or near the target frequency, where the target frequency is chosen to 1) satisfy the typical performance characteristics of the mouse and also 2) to place the operating frequency of the image sensor circuit in a central region of a DarkSQUAL minimum, e.g., at approximately 66.9 MHz in the test example shown in FIG. 5. Alternatively, rather than rely on the internal on-chip clock, embodiments may provide a stable external clock signal to drive the image sensor.

Figure 6:
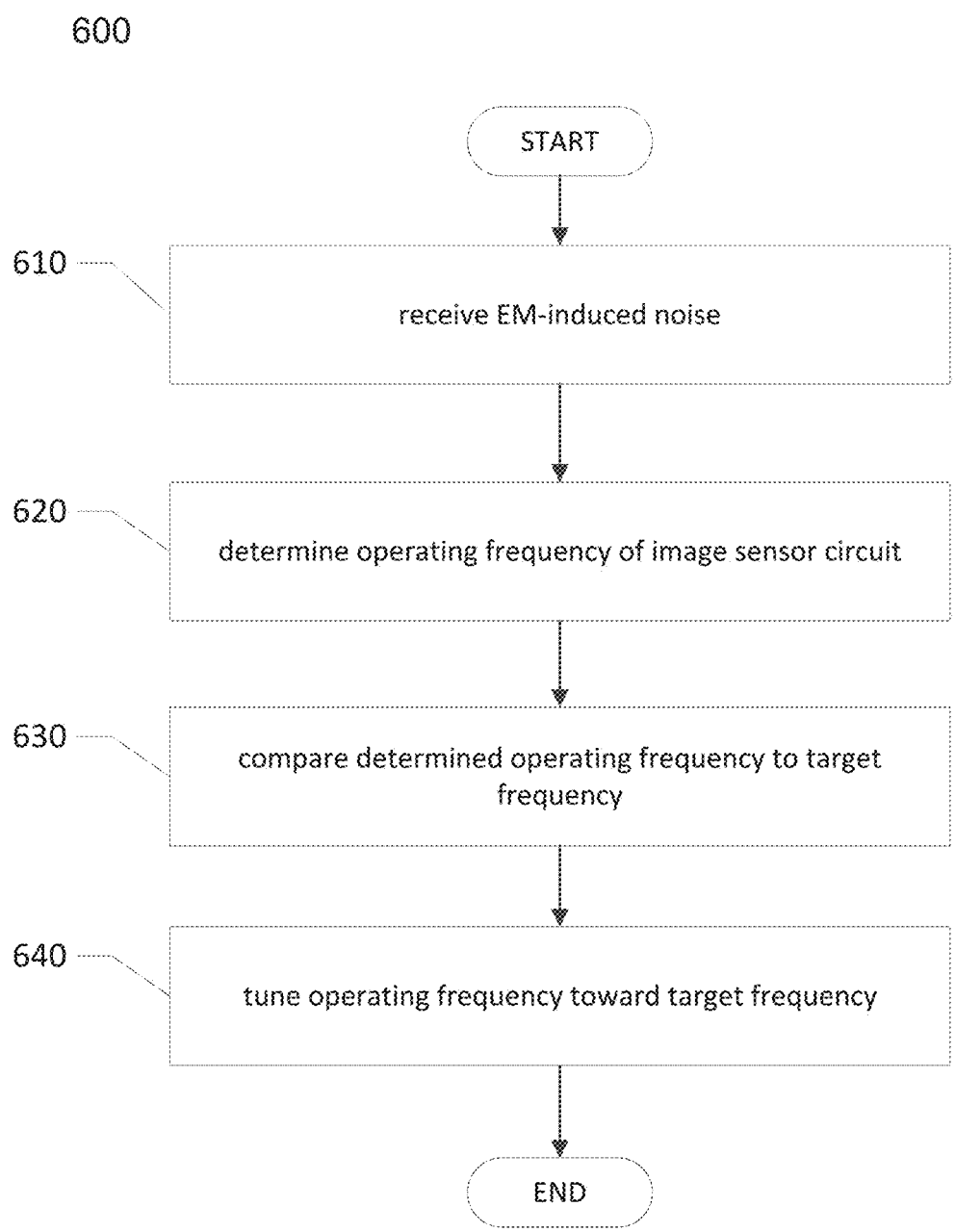
FIG. 6 is a flow chart showing a method of clock tuning for a wireless charging system, according to certain embodiments.
Figure 7:
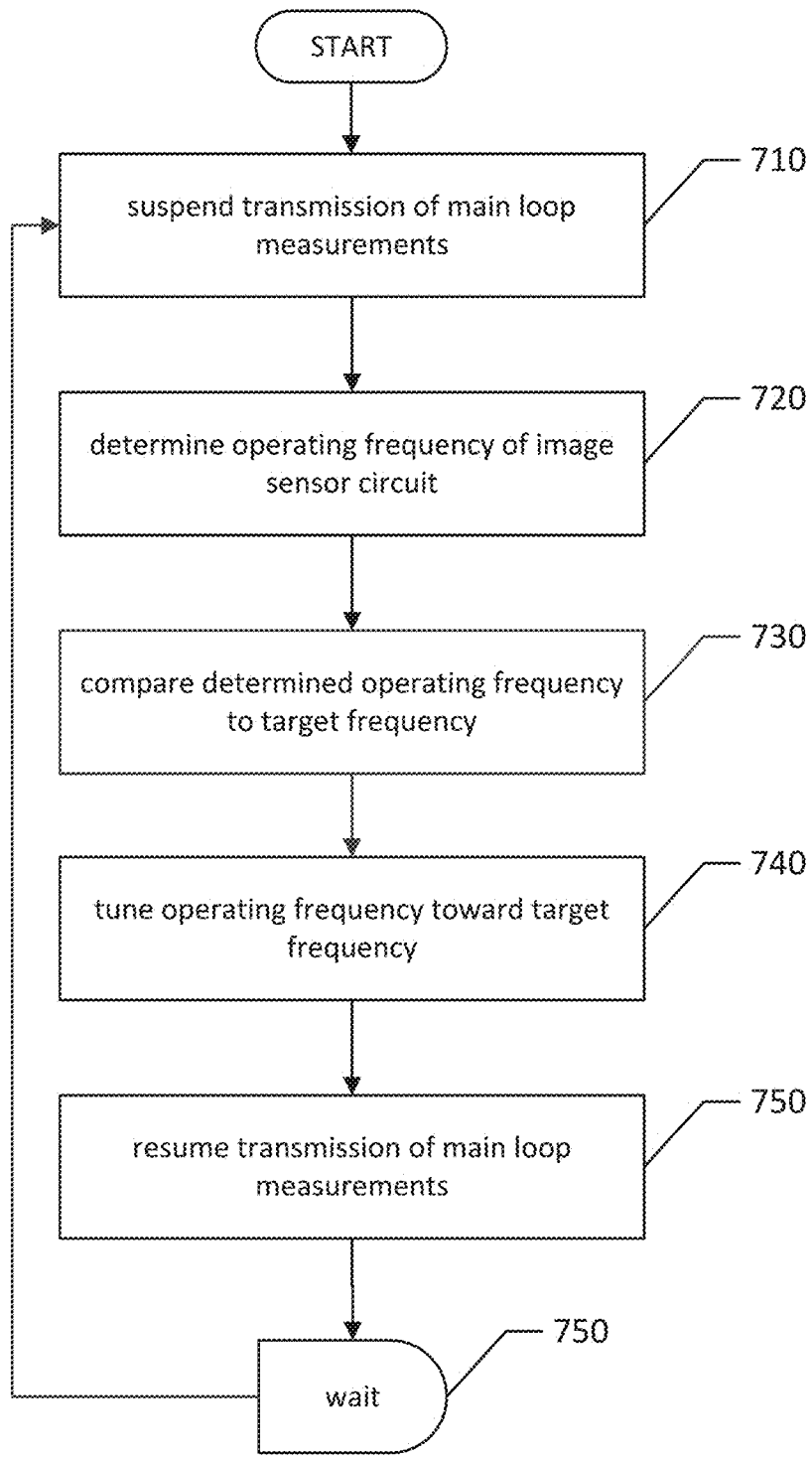
FIG. 7 is a flow chart showing a method of clock tuning for a wireless charging system, according to certain embodiments.

FIGS. 6-7 are flow charts showing methods 600, 700, respectively, for clock tuning for a wireless charging system according to certain embodiments. Methods 600, 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, methods 600, 700 can be performed by processor(s) 256 and/or 370, as shown and described above with respect to FIGS. 2 and 3, respectively. One of ordinary skill having the benefit of this disclosure will also appreciate that other variants of these methods are also possible without departing from the scope of the present disclosure.

According to certain embodiments, the method may take different forms depending on the initial state of the input device, e.g., whether the initial state of the input is a powered down state, a low power sleeping state, or an active, in-use state. According to certain embodiments, the tuning method may commence shortly after power is applied to the user input device, e.g., after a user toggles a power switch that causes the device to turn on and begin to consume its internal power source and/or causes the input device to initiate communication with a base device and begin receiving wireless power from the EM field of the base device, as described above in reference to FIGS. 1-3. According to certain embodiments, when the input device starts in a sleep state (as might occur after several minutes of inactivity), the power switch may already be in an "on state" but only limited power may be applied to certain user input sensors, e.g., motion sensors and certain switches. While in the sleep mode/state, a user may wake up the device by moving or shaking the input device and/or pressing certain buttons, e.g., pressing the right and/or left click buttons, revolving the roller wheel, etc. In certain embodiments, the frequency measurement may be undertaken shortly after startup, i.e., just before (or just after) the image sensor circuit begins any position measurement, e.g., the measurement may take place according to the usual boot up sequence of the input device and therefore any additional delays caused by the measurement itself may be unnoticeable to the user. In still yet other embodiments, the methods may operate when the mouse is in active use by a user.

FIG. 6 is a flow chart showing a method 600 for clock tuning for a wireless charging system, according to certain embodiments. At step 610, EM-induced noise is received by the input device. According to certain embodiments, the mouse may be resting on the surface of an external noise source, e.g., a wireless charging pad or base device similar to that described above in FIGS. 1-4. According to certain embodiments, the image sensor circuit may be architected and/or fabricated in such a way that it picks up, or preferentially absorbs a radiated EM field that is emitted from the base device (e.g., a wireless charging EM field) thereby contributing to an EM-induced noise on the image sensor circuit, as described in more detail above in reference to FIGS. 4A-4F. Consequently, when the operating frequency of the image sensor circuit is within one or more bands of noise frequencies caused by the EM-induced noise, the computer mouse can generate an erroneous movement detection signal.

At step 620, the user input device commences a frequency measurement process to determine the operational frequency of the image sensor circuit. According to certain embodiments, an operational frequency measurement may commence by causing an clock output pin of the image sensor circuit (e.g., EXTCLK pin) to output a clock signal. While the particular method for turning on the output from the pin may vary from chip to chip, in one example, the output pin may be turned on by providing a serial peripheral interface ("SPI") command from a processor, e.g., from an MCU and/or from external processor(s) 256 and/or processor(s) 370 as described above in reference to FIGS. 1-3. In response to the SPI command, the clock pin may then send out a clock pulse train at a subset frequency of an internal oscillator of the image sensor circuit, e.g., ½ the internal oscillator frequency, ⅓ the internal oscillator frequency, etc. The pulse train can then be measured by the external processor(s) (or some other external frequency measurement circuitry) using a pulse counting technique, or the like, to determine the operating frequency of the image sensor circuit. While the description above focuses on a method of measurement of the operation frequency using a dedicated pin, as would be appreciated by one of ordinary skill in the art having the benefit of this disclosure, other methods are possible, e.g., the operating frequency of the image sensor circuit can be measured indirectly by measuring the pulse rate of the illumination device (LED or laser) that is sync with sensor frame rate and thus in sync with the oscillator.

At step 630, the value of the frequency measurement is compared to a target frequency. As described above in reference to FIG. 5, the target frequency can be chosen based on two criteria: 1) the motion tracking performance and power management specifications of the input device should be met and; 2) the operating frequency of the image sensor circuit over the range of expected operating temperatures should avoid certain bands of frequencies where the Dark-SQUAL signal is largest (e.g., those frequencies where the charging pad induced noise is greatest thereby resulting in erroneous movement detection). According to certain embodiments, the comparison may be accomplished by the external processor(s) (or some other external comparator circuitry) using any comparison technique, e.g., by taking a difference between the target frequency and the measured operating frequency of the image sensor circuit.

Depending on whether the current operating frequency of the image sensor circuit is larger than or smaller than the target frequency, the system increases or decreases the operating frequency to tune the operating frequency toward the target frequency (i.e., to make the magnitude of the difference between the operating frequency of the image sensor circuit and the target frequency smaller). According to certain embodiments, the tuning may be accomplished using a multi-step iterative process, e.g., according to a binary search. In other embodiments, to minimize the time taken for the tuning operation, the tuning may involve moving the frequency using only a single discrete step, or only two steps, or only three steps and so on. As used herein the term "discrete step" refers to a minimum frequency change, i.e., a minimum frequency step, supported by the image sensor circuit and the step may be measured in either absolute frequency or as a percentage of the operating frequency of the image sensor circuit. According to certain embodiments, the frequency adjustment may be accomplished by the external processor(s) (or some other external tuning circuitry) by providing a signal that changes a value in one or more internal registers of the image sensor circuit, e.g., for some sensors the default value of the register may be an externally programmable hexadecimal value, and altering this hexadecimal value may change the operating frequency of the image sensor circuit by one or more frequency steps.

According to certain embodiments, the frequency step size may vary from chip-to-chip and even from step-to-step within the same chip, with each chip having a minimum step size. According to certain embodiments, the discrete steps may be in either absolute frequencies or percentages of the operating frequency of the image sensor circuit. For example, given an operating frequency of 68 MHz, steps of 0.6% (408 kHz), 1.2% (816 kHz), 1.5% (1.02 MHz), etc., of the operating frequency may be used or, e.g., given an operating frequency of 68 MHz, absolute frequency steps of 400 kHz (0.59%), 800 kHz (1.2%), 1.00 MHz (1.5%), etc. can be used. According to certain embodiments, the exact value of the step size need not be known because the system can employ a binary search process to adjust the operating frequency to the closest possible value, given the step sizes available. In other examples, the step size for any given operating frequency may be known and/or estimated to avoid overshoot and/or undershoot in situations where only one, two, three, and so on, steps are used.

According to certain embodiments, e.g., if tuning speed is of great importance, e.g., to avoid any perceptible degradation in performance during the clock tuning process when the mouse is in an "in-use" state, step 640 may include tuning the operating frequency of the image sensor circuit only one or two steps when the magnitude of the difference between the operating frequency and the target frequency is larger than some threshold frequency value (or some fraction or multiple of a threshold value). In some embodiments, the threshold frequency value can be set to the minimum tuning step size (or some fraction or multiple of the minimum tuning step size) of the on-chip oscillator of the image sensor circuit. For example, in the 1 MHz step size example with a threshold set equal to 1 MHz, the system may tune the operating frequency when the magnitude of the difference between the operating frequency and the target frequency is greater than 1 MHz. Thus, after the tuning step, the magnitude of the difference between the operating frequency and the target frequency will be zero. Likewise, if the step size is 1 MHz and the threshold is chosen to be $3/4$ of the step size, the system will tune the operating frequency by 1 MHz when the magnitude of the difference between the operating frequency and the target frequency is greater than or equal to 750 kHz. Thus, if the original difference was +750 kHz, the difference after one tuning step will be −250 kHz.

According to certain embodiments, the system may employ one or more threshold values and depending on the precise value of the magnitude of the difference between the operating frequency of the image sensor circuit and the target frequency, the system may tune only one frequency step, two frequency steps, etc. to bring the operating frequency of the image sensor circuit closer to the target frequency. For example, the system may tune by a single step if the difference between the operating frequency of the image sensor circuit and the target frequency is greater than 2% but less than 4.5% and may tune by two steps if the difference is greater than or equal to 4.5%. As would be appreciated by one of ordinary skill in the art with the benefit of this disclosure, more than two thresholds and two steps may be used. In other embodiments, the threshold frequency value may be related to the width (in frequency space) of the local minimum in the DarkSQUAL noise level, as described above, and may or may not necessarily take into account the minimum step size, e.g., when the minimum step size is very small compared to the width of the local minimum. In this example, the system may initiate a tuning process when the operating frequency of the image sensor circuit approaches one or more threshold frequencies that define the width of the local minimum. For example, tuning may initiate when the operating frequency of the image sensor circuit is slightly less than, equal to, or slightly larger than the one or more threshold frequencies and therefore becomes too close to an upslope in the DarkSQUAL noise level as shown in FIG. 5 above. In yet another example, the system may employ two thresholds, a high threshold and a low threshold that may be related to an upper bound frequency and a lower bound frequency that define the width of the DarkSQUAL minimum. For example, the upper bound and lower bound frequencies can be chosen such that DarkSQUAL noise level is less than 10 for either bound. Then the system may trigger a tune operation if the operating frequency of the image sensor circuit drifts above the upper bound or below the lower bound. In yet other embodiments, the system may perform online noise measurements, e.g., a DarkSQUAL noise level measurement, and then trigger a frequency tune operation based on a measured noise being above a threshold value. As would be appreciated by one of ordinary skill in the art, many different threshold schemes are possible without departing from the scope of the present disclosure.

FIG. 7 is a flow chart showing a method 700 for clock tuning for a wireless charging system according to certain embodiments, more specifically in cases when the input device is in an "in-use" state. The term "in-use" is used herein to mean that the clock is tuned while the input device, e.g., a computer mouse, is being moved (and/or clicked), e.g., during a gaming session, as the mouse is being slid across the surface of a base device that is a charging mouse pad. Furthermore, according to certain embodiments, the mouse may also be receiving EM power from the mouse pad right before, right after, or even during the frequency tuning method.

In step 710, transmission of the position data (also referred to herein as the position measurement loop which may be part of the so-called main loop) are, for a time period (e.g., 1 ms or less), temporarily suspended to allow the system to make a measurement of the operating frequency of the image sensor circuit. According to some embodiments, during the suspension period, the position measurements themselves are not suspended but instead are accumulated in memory. More generally, during the suspension period all of the so-called main loop measurements can be suspended and accumulated including, but not limited to, motion update data, roller update data, and switch make or break data, etc.

In step 720, the operating frequency of the image sensor circuit is determined, e.g., by processor(s) 370 as described above in reference to FIGS. 2-3 and 6. In some embodiments, the determination may occur within a 1 ms slot. In certain embodiments, because the determination is undertaken during normal operation of the input device, the measurement period should be as short as possible so as to avoid any user-perceptible degradation of the responsivity of the input device.

In step 730, in an manner similar to that described above in FIG. 6, the value of the frequency determination can be compared to a target frequency. As described above in reference to FIGS. 4-5, the target frequency can be chosen in advance based on two criteria: 1) the motion tracking performance and power management specifications of the input device should be met and; 2) the operating frequency of the image sensor circuit over the expected range of operating temperatures should avoid certain bands of frequencies where the DarkSQUAL noise level is largest (e.g., those frequencies where the charging pad induced noise is greatest).

In step 740, in an manner similar to that described above in FIG. 6, the system tunes the operating frequency of the image sensor circuit toward the target frequency (i.e., to make the magnitude of the difference between the operating frequency and the target frequency smaller). According to certain embodiments, the image sensor circuit may support the tuning of the operating frequency of the image sensor circuit in one or more discrete steps and/or employing one or more thresholds as described above in reference to FIG. 6.

In step 750, transmission of the position data is resumed and the measurements that were accumulated in memory during the suspended interval are merged and sent in the next USB report. Step 750 may occur once the operating frequency of the image sensor circuit has been tuned and/or when the suspension time period has expired. Once transmission of the position data is resumed, the system then enters a waiting, fully operational state and waits for a period of time before conducting the frequency tuning method again, e.g., on the order of minutes, e.g., 2 minutes. In this way, the method for clock tuning for a wireless charging system may occur perpetually, in a looping manner. As would be appreciated by one of ordinary skill in the art having the benefit of this disclosure, having the loop configured to tune the input device every 2 minutes is merely one example of the more general method of perpetual tuning and accordingly, the tuning period can be any appropriate value, e.g., based on the expected temperature change of the image sensor circuit for a particular use case. According to certain embodiments, the tuning method may be triggered periodically at one rate, e.g., every 2 minutes, when a certain temperature drift is expected, and then may be triggered periodically at another (faster or slower) rate depending on the expected temperature drift. Asynchronous tuning, i.e., tuning at any arbitrary time based on some trigger, may also be implemented without departing from the scope of the present disclosure.

According to certain embodiments, as mentioned above, during the suspension period, the position data is accumulated in memory and then merged and subsequently sent in the next report of position and/or main loop data (USB reports may normally be sent at a periodic rate, e.g., every 1 ms). Accordingly, "suspension" as used herein does not necessarily mean that the position measurements are not taken, just that during the suspension time period (during which the frequency is measured), the position measurements can be accumulated and then, after the suspension time period has expired, the position measurements that have been accumulated during the suspension time period may be merged into the next USB report. Thus, position data is not lost during the suspension time period and after the suspension time period, data that has been generated is transmitted to the host. In this manner, the input device can accomplish a relatively fast frequency measurement and tuning process, e.g., one that completes within a the time period of 1 single USB report (e.g., 1 ms or less) thereby minimizing the user-perceptible effect on mouse performance. In accordance with one or more embodiments, the change in performance will be imperceptible by a user of the input device. As would be appreciated by one of ordinary skill in the art with the benefit of this disclosure, "USB reports" are described herein as merely one example of a communication method/protocol, and other method/protocols may be used without departing from the scope of the present disclosure. Furthermore, according to certain embodiments, if the suspension period is fast enough, the position data may be dropped without providing any degradation of the user experience.

Figure 8:
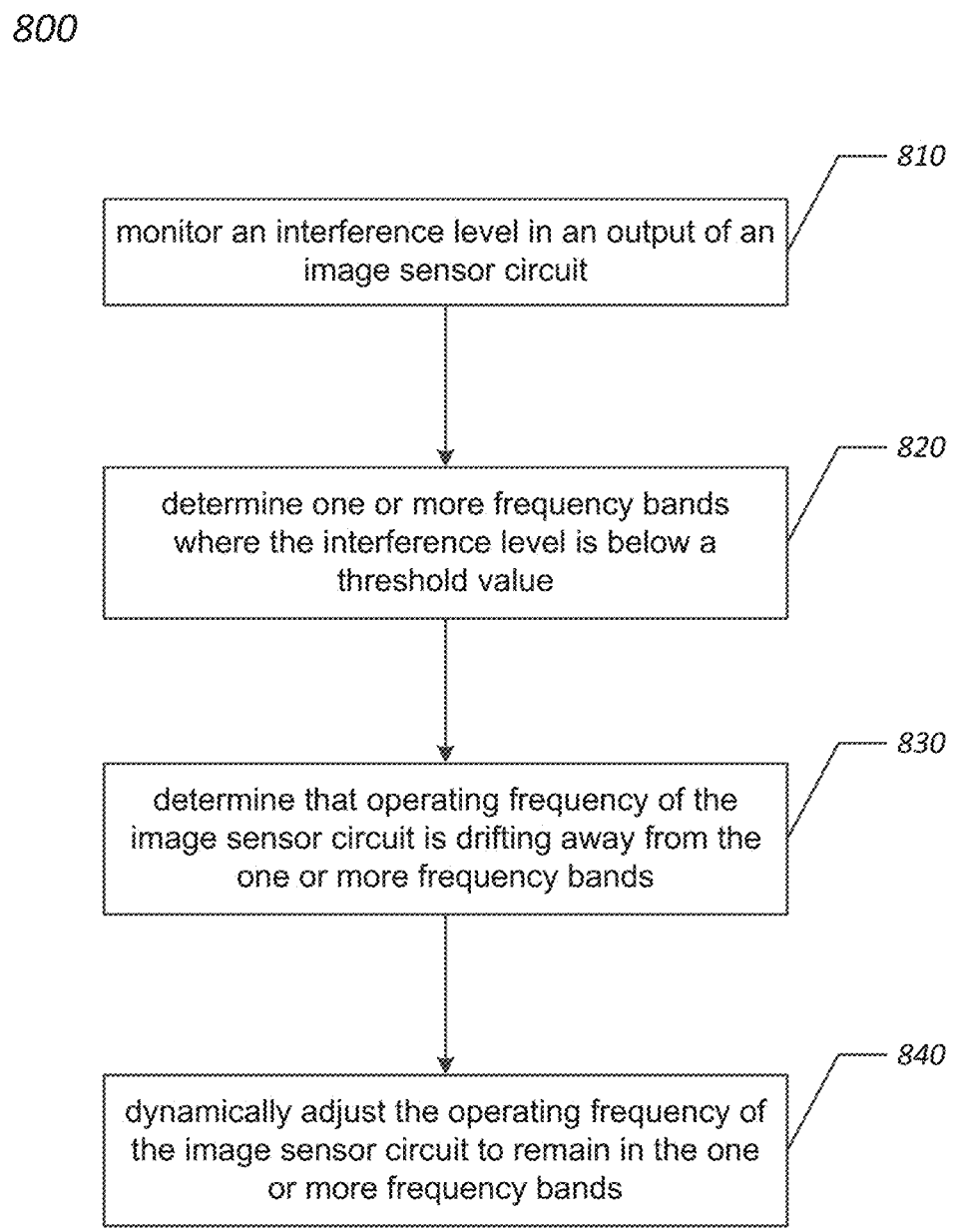
FIG. 8 is a flow chart showing a method of clock tuning for a wireless charging system, according to certain embodiments.

FIG. 8 is a flow chart showing a method 800 for clock tuning for a wireless charging system according to certain embodiments. In method 800, the operating frequency of the image sensor circuit is measured and tuned in the same manner to that described above in reference to FIGS. 6-7 as well as monitoring the interference level as described above in reference to FIG. 5.

In step 810, the system monitors interference level in an output of an image sensor circuit caused by an electromagnetic (EM) field. As already described above, the interference level can be monitored a number of different ways including by monitoring the DarkSQUAL signal as described above in reference to FIG. 5.

In step 820, one or more frequency bands are determined where the interference level (e.g., a noise level) is below a threshold value, e.g., as described above in reference to FIGS. 5-7.

In step 830, it is determined that an operating frequency of the image sensor circuit is drifting away from the one or more frequency bands, e.g., as the result of an operating temperature drift of the image sensor circuit, e.g., as described in reference to FIGS. 6-7.

In step 840, the operating frequency of the image sensor circuit is dynamically adjusted to remain in the one or more frequency bands. The adjustment can be in response to determining that the operating frequency is drifting away from the one or more frequency bands. As describe above, the frequency can be dynamically adjusted a number of different ways, e.g., as described in reference to FIGS. 6-7.

It should be appreciated that the specific steps illustrated in FIGS. 6-8 provide examples of a methods 600 and 800 for clock tuning for a wireless charging system according to certain embodiments. Other sequences of steps may also be performed according to alternative embodiments. For example, alternative embodiments may perform the steps outlined above in a different order. Moreover, the individual steps illustrated in FIGS. 6-8 may include multiple sub-steps that may be performed in various sequences as appropriate to the individual step. Furthermore, additional steps may be added or removed depending on the particular applications. For example, the term "measuring" should not be interpreted narrowly to be limited to only active measurements, but also includes the reading of a value for the operating frequency of the image sensor circuit that may have been previously measured, computed, and/or stored.

As described above, the comparing steps (steps 630 and/or 730) may involve comparing the operating frequency of the image sensor circuit to two or more thresholds (e.g., one or more upper and lower threshold values) and/or checking whether or not the operating frequency of the image sensor circuit is within or outside of a range or band of frequencies (e.g., where the range may be defined by the width of one or more minima in the DarkSQUAL noise level). In some embodiments, the operating frequency may be compared to one or more frequencies that define the outer bounds of the one or more bands of frequencies and then tuned in response to the operating frequency being closer than a minimum allowable distance from the one or more bands of noise frequencies. For example, the processor(s) may compute a difference between the operating frequency and an outer bound frequency that defines one outer bound of a band of frequencies and tune the operating frequency in response to the difference between the operating frequency and the outer bound frequency dropping above or below a threshold value. In some embodiments, the threshold frequencies compared against may be entirely independent of the minimum step size for frequency tuning. In other embodiments, where the minimum step size is very small, or even continuous, the tuning done in steps 640 and/or 740 may be independent of the minimum step size for frequency tuning. Yet other embodiments of the method may employ a feedback and control system (PID controller or variant thereof) to continuously tune the frequency to be at or near the target frequency. Still other embodiments may employ indirect frequency stabilization through direct temperature measurement and/or stabilization, in which case, the methods in FIGS. 6-7 would infer the operating frequency of the image sensor circuit based on a temperature measurement. In such embodiments, steps 620 and 720 may involve measuring/reading the temperature of the image sensor circuit and computing an operating frequency of the image sensor circuit based on the temperature, e.g., by way of a lookup table or calibration curve. The above list is not intended to be an exclusive one and one of ordinary skill in the art having the benefit of this disclosure would recognize and appreciate many additional variations, modifications, and alternatives of methods 600, 700, and 800.

As provided herein, the specification and drawings are to be regarded in an illustrative rather than a restrictive sense. It will, however, be evident that various modifications and changes may be made thereunto without departing from the broader spirit and scope of the disclosure as set forth in the claims.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like. Software can be implemented as a single program or a collection of separate programs and can be stored in non-volatile storage and copied in whole or in-part to volatile working memory during program execution. From a storage subsystem, processing devices can retrieve program instructions to execute, that when executed cause various operations as described herein.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

What is claimed is:

1. A computer mouse comprising:
   a housing;
   one or more processors; and
   an image sensor circuit coupled to the housing and operatively coupled to the one or more processors, the image sensor circuit configured to image a surface to detect movement of the computer mouse with respect to the surface,
   wherein the image sensor is susceptible to receiving electromagnetic (EM) radiation emitted from a source external to the computer mouse, wherein the received EM radiation induces noise within one or more bands of noise frequencies and the image sensor circuit generates erroneous movement detection signals in response to an operating frequency of the image sensor circuit being within the one or more bands of noise frequencies,
   wherein the image sensor circuit is configured to operate at an operating frequency outside of the one or more bands of noise frequencies while imaging the surface,
   wherein the operating frequency drifts as a result of a change of temperature of the computer mouse, and
   wherein the one or more processors are configured to tune the operating frequency of the image sensor circuit towards a target frequency in response to the operating frequency of the image sensor circuit deviating from the target frequency.

2. The computer mouse of claim 1, wherein the one or more processors are configured to tune the operating frequency of the image sensor circuit towards the target frequency in response to the operating frequency deviating from the target frequency by a threshold frequency value.

3. The computer mouse of claim 1, wherein the image sensor circuit is configured to be tunable by at least a minimum frequency step, and wherein the one or more processors are configured to tune the operating frequency of the image sensor circuit towards the target frequency in response to the operating frequency deviating from the target frequency by at least the minimum frequency step.

4. The computer mouse of claim 1, wherein the target frequency of the image sensor circuit is between sixty-six MHz and sixty-eight MHz.

5. The computer mouse of claim 1, further comprising an external oscillator operatively coupled to the image sensor circuit, the external oscillator configured to drive the image sensor circuit to operate at the operating frequency.

6. A method of operating a computer mouse, the method comprising:

receiving electromagnetic (EM) radiation emitted from a source external to the computer mouse, wherein the received EM radiation induces noise within one or more bands of noise frequencies and an image sensor circuit of the computer mouse generates erroneous movement detection signals in response to an operating frequency of the image sensor circuit being within the one or more bands of noise frequencies;

determining a current operating frequency of the image sensor circuit;

comparing the current operating frequency to a target frequency, wherein the target frequency is outside of the one or more bands of noise frequencies; and tuning the current operating frequency of the image sensor circuit towards the target frequency.

7. The method of claim 6, further comprising:

suspending a position measurement of the computer mouse before determining the operating frequency; and resuming the position measurement after tuning the operating frequency of the image sensor circuit.

8. The method of claim 6, wherein the target frequency is within a range of 66.9 MHz+/−500 kHz.

9. The method of claim 6, wherein:

the EM radiation is received by an antenna of the computer mouse;

the source external to the computer mouse is a base device; and the antenna is electrically coupled to an energy storage component of the computer mouse configured to be charged with power provided by the EM radiation.

10. A method of operating an input device, the method comprising:

suspending, for a suspension time period, a transmission of position data;

determining an operating frequency of an image sensor circuit;

comparing the operating frequency of the image sensor circuit to a target frequency, wherein the target frequency is selected based on an interference-induced noise within one or more frequency bands, the interference-induced noise is caused by a wireless charging system operatively coupled to the input device, the interference-induced noise causes the image sensor circuit to generate erroneous movement tracking data in response the operating frequency of the image sensor circuit falling within the one or more frequency bands, and the target frequency is not included in the one or more frequency bands;

determining that the operating frequency deviates from the target frequency;

in response to determining that the operating frequency deviates from the target frequency, tuning the operating frequency of the image sensor circuit to converge towards the target frequency; and resuming the transmission of position data.

11. The method of claim 10, wherein resuming the transmission of position data further comprises sending position data that has accumulated during the suspension time period.

12. The method of claim 10, wherein the determining an operating frequency, the comparing and the tuning are accomplished within the suspension time period.

13. The method of claim 10, wherein the suspension time period is less than a time period for accumulating a single report of position data.

14. The method of claim 10, wherein the target frequency is within a range of 66.9 MHz+/−500 kHz.

* * * * *